(12) United States Patent
Kim et al.

(10) Patent No.: US 10,864,795 B2
(45) Date of Patent: Dec. 15, 2020

(54) AIR CONDITIONER FOR VEHICLE

(71) Applicant: Hanon Systems, Daejeon (KR)

(72) Inventors: Seok Kim, Daejeon (KR); Young Kee Baek, Daejeon (KR); Boo Yong Um, Daejeon (KR); Yong Sik Kim, Daejeon (KR); Byeong Ha Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 61 days.

(21) Appl. No.: 16/294,485

(22) Filed: Mar. 6, 2019

(65) Prior Publication Data

US 2019/0315189 A1    Oct. 17, 2019

(30) Foreign Application Priority Data

Mar. 7, 2018   (KR) .................. 10-2018-0026715
Oct. 5, 2018   (KR) .................. 10-2018-0118881

(51) Int. Cl.
 *B60H 1/00*   (2006.01)
 *B60H 1/32*   (2006.01)

(52) U.S. Cl.
 CPC ..... *B60H 1/00535* (2013.01); *B60H 1/00528* (2013.01); *B60H 1/3233* (2013.01); *B60H 2001/00635* (2013.01)

(58) Field of Classification Search
 CPC ............. B60H 1/00535; B60H 1/3233; B60H 1/00528; B60H 2001/00635; B60H 1/00571; B60H 1/00507; B60H 1/00564; F16L 5/02; F16L 3/00; F16L 3/08; F16L 3/10; F28D 15/0275
 See application file for complete search history.

(56) References Cited

U.S. PATENT DOCUMENTS 6,351,962 B1 *   3/2002   Mizutani ............ B60H 1/00528
                                                              180/90

FOREIGN PATENT DOCUMENTS

| DE | 102016101603 B3 | 5/2017 | |
|---|---|---|---|
| JP | H1086651 A | 4/1998 | |
| JP | 2009067356 A * | 4/2009 | ......... B60H 1/00535 |
| JP | 5053777 B2 | 10/2012 | |
| KR | 10-1521514 B1 | 5/2015 | |

* cited by examiner

*Primary Examiner* — Emmanuel E Duke
(74) *Attorney, Agent, or Firm* — Norton Rose Fulbright US LLP; James R. Crawford

(57) ABSTRACT

The present invention relates to an air conditioner for a vehicle can enhance sealing performance and is resistant to noise and vibration, and prevent penetration of water into the interior of the vehicle by inducing water introduced into a seal into an air-conditioning case by a pressure difference. The air conditioner for a vehicle, which has a structure that a pipe of a heat exchanger penetrates through a dash panel (150) of the vehicle, includes: a bracket (140) for inserting and fixing the pipe; and a seal (160) for fixing the bracket (140) between an air-conditioning case and the seal to get in contact with the air-conditioning case.

18 Claims, 19 Drawing Sheets

PRIOR ART

AIR CONDITIONER FOR VEHICLE

This application claims priority from Korean Patent Application Nos. 10-2018-0026715 filed on Mar. 7, 2018 and 10-2018-0118881 filed on Oct. 5, 2018. The entire contents of these applications are incorporated herein by reference in their entirety.

BACKGROUND OF THE INVENTION

Field of the Invention

The present invention relates to an air conditioner for a vehicle, and more particularly, to an air conditioner for a vehicle, which installed in a vehicle in order to keep room conditions, such as temperature, humidity, air current, and cleanliness, appropriate for use purposes.

Background Art

In general, an air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes an evaporator for cooling the inside of an air-conditioning case; a heater core for heating the inside of the air-conditioning case; and a mode converting door for selectively blowing the air cooled by the evaporator or heated by the heater core toward parts of the interior of the vehicle.

Japanese Patent No. 5053777 (Aug. 3, 2012) discloses an air conditioner for a vehicle, which can avoid noise or vibration caused by an expansion valve and enhance sealability to prevent rainwater from penetrating into the interior of the vehicle or into an air-conditioning case from an engine room without deterioration of assemblability through a simple structure.

FIG. 1 is a view showing around an opening part of a dash panel of a convention air conditioner for a vehicle. As shown in FIG. 1, a vehicle includes an engine room and a dish panel 4 which is a partition for dividing the interior of the vehicle. Pipes, such as a refrigerant pipe, a cooling water pipe, and so on, penetrates through an opening 5 of the dash panel 4 in order to connect an outdoor unit with an indoor unit or connect the engine room with a heater core.

The pipe near the engine room and the pipe near the interior of the vehicle are connected through an expansion valve 6, and the expansion valve 6 is located at the opening of the dash panel 4. An air-conditioning case 1 includes an upper air-conditioning case 2 and a lower air-conditioning case 3, and a seal 7 disposed between the upper air-conditioning case 2 and the lower air-conditioning case 3 to surround the expansion valve 6. The seal 7 has a circumferential flange 8 getting in contact with the circumference of the opening 5 of the dash panel 4.

The conventional air conditioner for a vehicle has the possibility that noise of high frequency is introduced into the interior of the vehicle due to a fine gap between the seal and the case in an aspect of sound transmission loss (STL) performance to prevent noise of the engine room from being introduced into the interior. Moreover, the conventional air conditioner for a vehicle has the possibility that water is introduced into the interior of the vehicle due to the fine gap between the seal and the case when water of high pressure is introduced into the engine room.

In the meantime, Korean Patent No. 1521514 (May 13, 2015) discloses an air conditioner for a vehicle having a structure that a condensate drain guide unit is formed to prevent introduction of condensate and promote a smooth drain of the condensate so that water is introduced into the air-conditioning case through the condensate drain guide unit and is discharged out. Furthermore, the air conditioner disclosed in Korean Patent No. 1521514 has a structure to guide air inside the air-conditioning case to the condensate drain guide unit and discharge the air and water to the outside in order to perform more smooth drain through the condensate drain guide unit.

Such a conventional condensate drain structure has a condensate recovery space formed below a pipe to collect condensate formed on the surface of the pipe or water introduced from the outside, and discharges the collected condensate or water to the outside by dropping into the air-conditioning case. Such a drain structure still has a disadvantage in that the condensate collected in the condensate recovery space is not smoothly drained into the air-conditioning case. Additionally, there is a structure having an air guide means mounted in the air-conditioning case to drain water and air. However, such a structure has several disadvantages in that the air guide means deteriorates air-conditioning performance and drain is not smooth since serving as a resistor against to an air flow.

PATENT LITERATURE

Patent Documents

Patent Document 1: Japanese Patent No. 5053777 (Aug. 3, 2012)
Patent Document 2: Korean Patent No. 1521514 (May 13, 2015)

SUMMARY OF THE INVENTION

Accordingly, the present invention has been made to solve the above-mentioned problems occurring in the prior arts, and it is an object of the present invention to provide an air conditioner for a vehicle having a dual sealing structure, which can enhance sealing performance and is resistant to noise and vibration.

It is another object of the present invention to provide an air conditioner for a vehicle, which can prevent penetration of water into the interior of the vehicle by inducing water introduced into a seal into an air-conditioning case by a pressure difference.

To accomplish the above object, according to the present invention, there is provided an air conditioner for a vehicle having a structure that a pipe of a heat exchanger penetrates through a dash panel of the vehicle, including: a bracket for inserting and fixing the pipe; and a seal for fixing the bracket between an air-conditioning case and the seal to get in contact with the air-conditioning case.

The air conditioner for a vehicle according to the present invention can increase performance for reducing noise transferred from the engine room, provide strong durability to vibration transferred from the vehicle, and prevent introduction of water by strengthening watertightness.

Moreover, the air conditioner for a vehicle according to the present invention can effectively prevent penetrated moisture from being introduced into the interior of the vehicle and solve noise problems since pressure around the expansion valve is reduced through complicated passageways of the negative pressure forming part.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, technical structure of an air conditioner for a vehicle according to exemplary embodiments of the present invention will be described with reference to the accompanying drawings.

Figure 1:
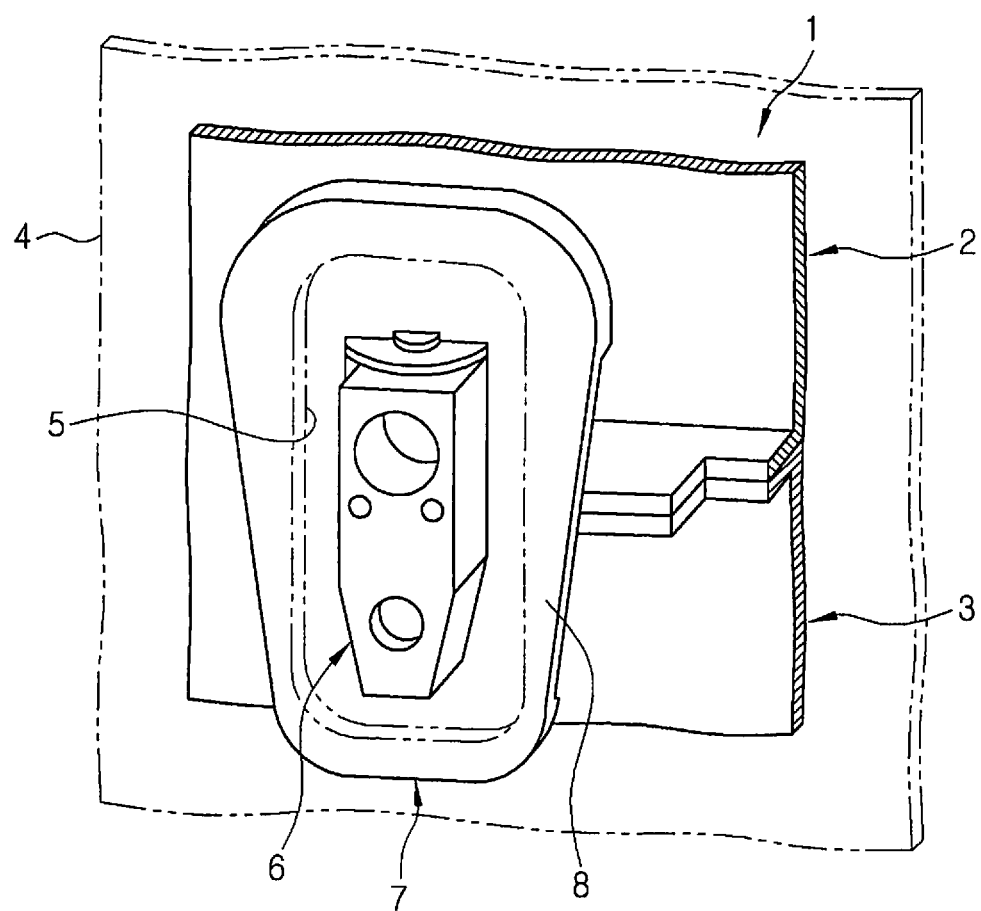
FIG. 1 is a view showing around an opening part of a dash panel of a convention air conditioner for a vehicle.
Figure 2:
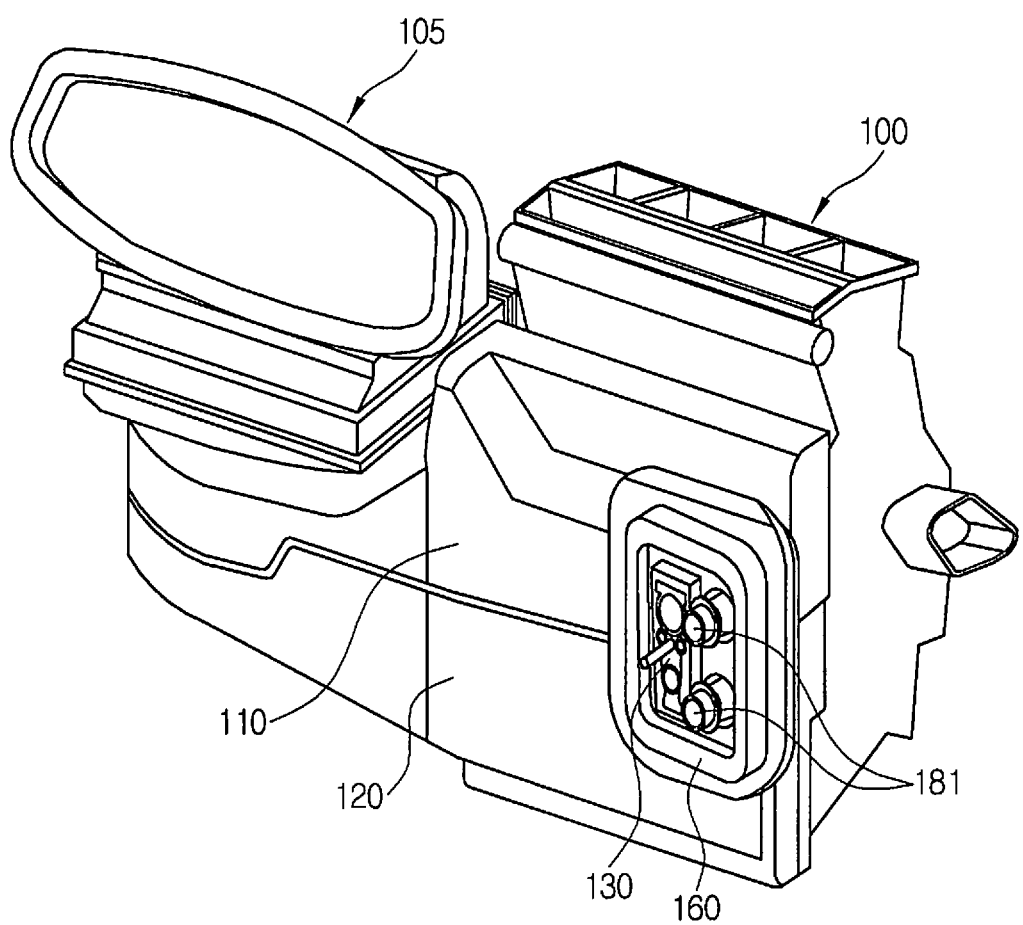
FIG. 2 is a perspective view showing an air conditioner for a vehicle according to a first preferred embodiment of the present invention.

FIG. 2 is a perspective view showing an air conditioner for a vehicle according to a first preferred embodiment of the present invention.

Referring to FIG. 2, the air conditioner for a vehicle according to the first preferred embodiment of the present invention includes an air-conditioning unit 100 and a blower unit 105. The blower unit 105 is aligned to the air-conditioning unit 100 in a width direction of the vehicle. The air-conditioning unit 100 includes an air-conditioning case, and an evaporator, a heater core and a plurality of doors are disposed in the air-conditioning case.

The air-conditioning case includes an upper air-conditioning case 110 and a lower air-conditioning case 120 vertically coupled with each other. An evaporator pipe is connected to the evaporator to extend toward the front of the vehicle where an outdoor unit is located. An end of the evaporator pipe is combined with an expansion valve 130, and the expansion valve 130 is fixed to a seal 160. The structure of the seal 160 will be described later in detail. A heater core pipe 181 is connected to the heater core to extend toward the front of the vehicle where an engine room is located.

Figure 3:
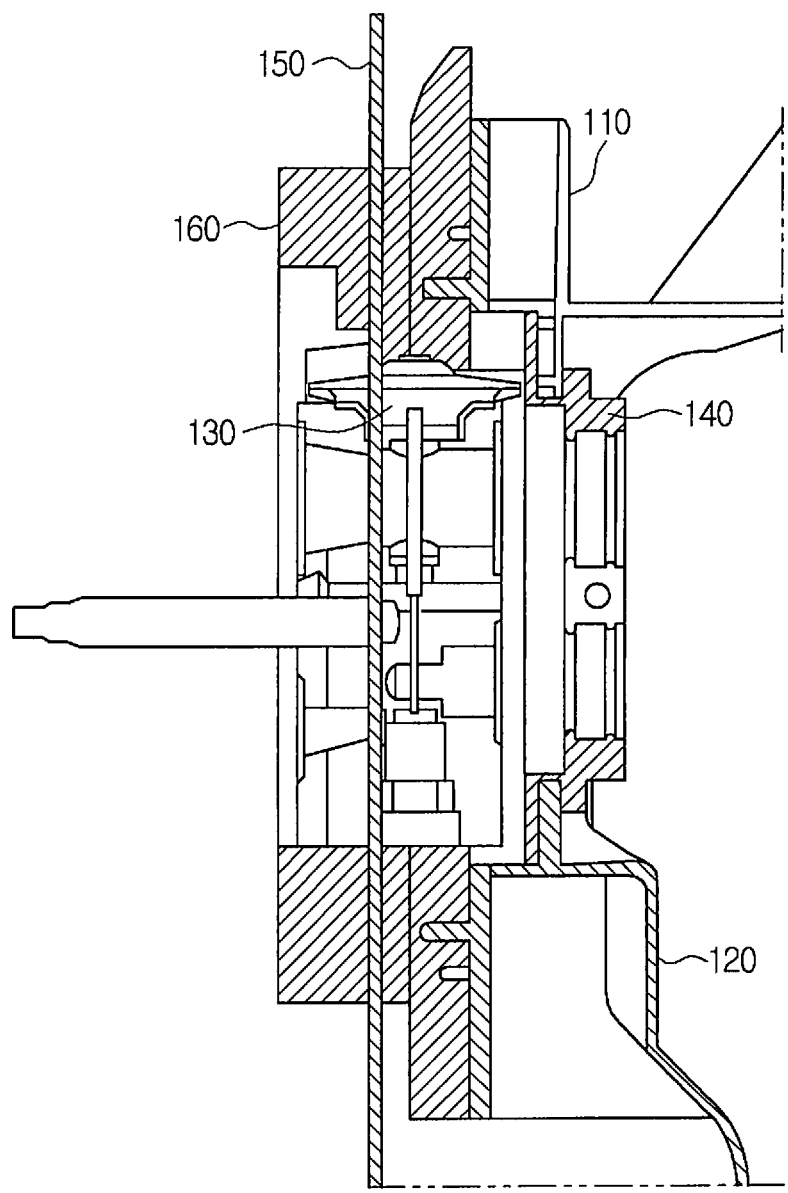
FIG. 3 is a sectional view showing a seal and a bracket of the air conditioner for a vehicle according to the first preferred embodiment of the present invention.
Figure 4:
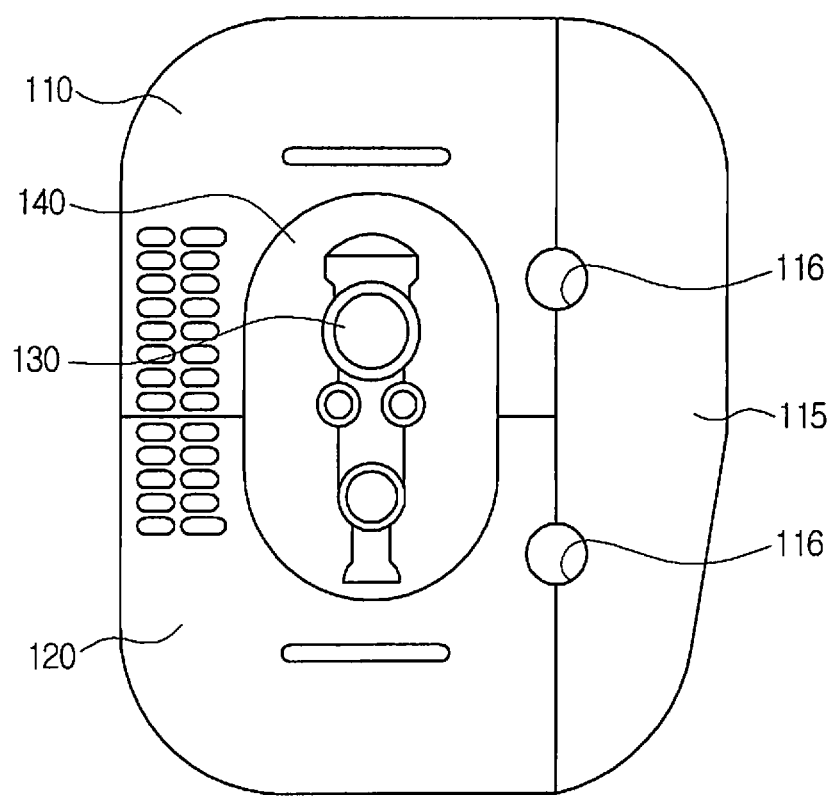
FIG. 4 is a front view of an air-conditioning case before the seal according to the first preferred embodiment of the present invention is mounted.
Figure 5:
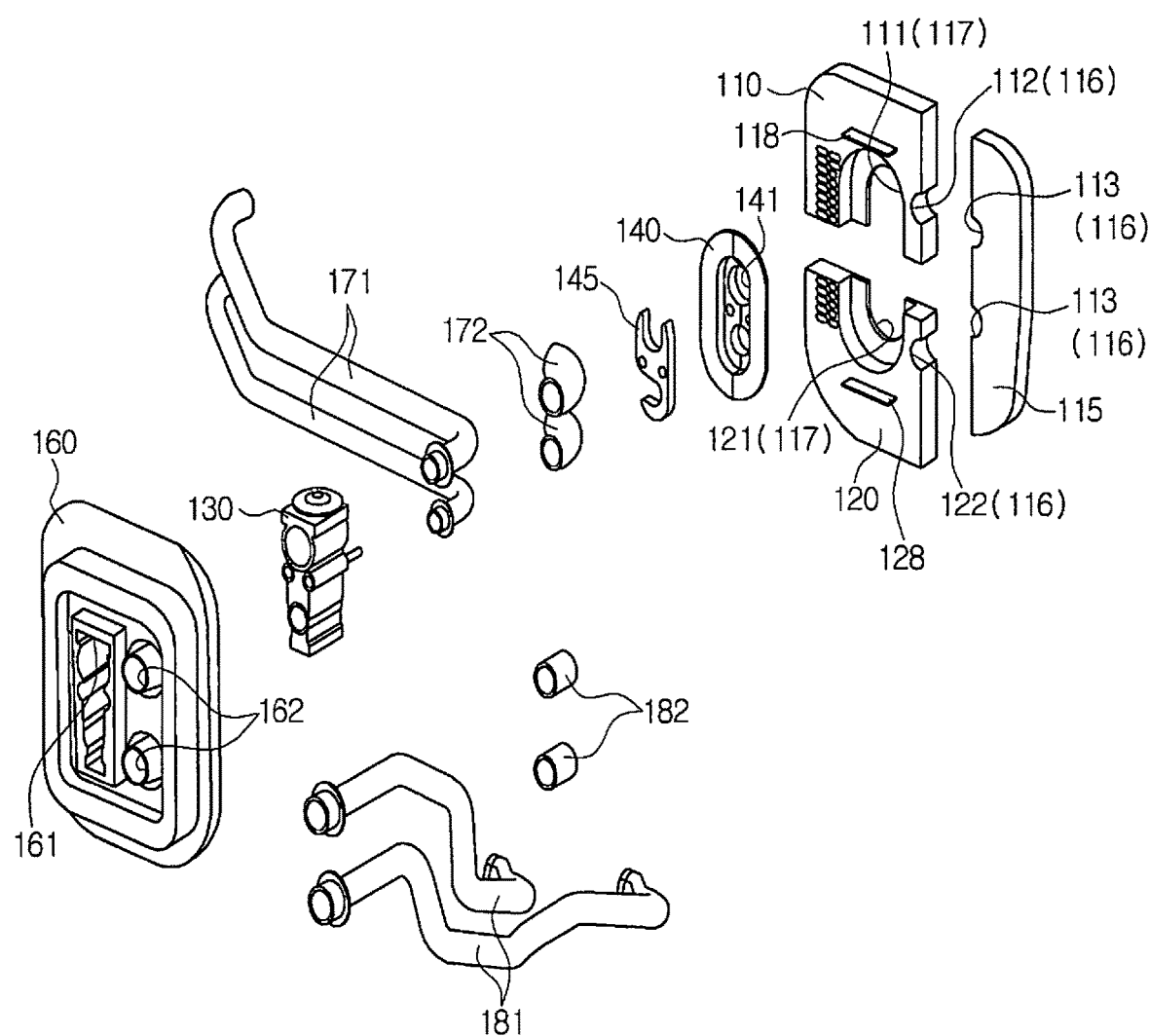
FIG. 5 is an exploded perspective view showing the air-conditioning case, a bracket, an expansion valve and the seal according to the first preferred embodiment of the present invention.

FIG. 3 is a sectional view showing a seal and a bracket of the air conditioner for a vehicle according to the first preferred embodiment of the present invention, FIG. 4 is a front view of an air-conditioning case before the seal according to the first preferred embodiment of the present invention is mounted, and FIG. 5 is an exploded perspective view showing the air-conditioning case, a bracket, an expansion valve and the seal according to the first preferred embodiment of the present invention.

Referring to FIGS. 3 to 5, the air conditioner for a vehicle according to the first preferred embodiment of the present invention has a structure that pipes of a heat exchanger, namely, an evaporator pipe 171 and a heater core pipe 181 penetrate through a dash panel 150 of the vehicle, and includes a bracket 140, an expansion valve 130, and a seal 160.

The air-conditioning case includes an upper air-conditioning case 110, a lower air-conditioning case 120, and a side bracket 115.

The lower air-conditioning case 120 is joined to a lower portion of the upper air-conditioning case 110, and an opening portion 117 is formed between the upper air-conditioning case 110 and the lower air-conditioning case 120. The bracket 140 is inserted and joined into the opening portion 117. That is, the upper air-conditioning case 110 has a semi-elliptical groove 111, and the lower air-conditioning case 120 also has a semi-elliptical groove 121 corresponding to the semi-elliptical groove 111 of the upper air-conditioning case 110, so that the elliptical opening portion 117 is formed when the upper air-conditioning case 110 and the lower air-conditioning case 120 are coupled with each other.

The side bracket 115 is joined to the sides of the upper air-conditioning case 110 and the lower air-conditioning case 120 in order to form a pipe insertion hole 116 between the upper air-conditioning case 110 and the lower air-conditioning case 120. The heater core pipe 181 is inserted and fixed into the pipe insertion hole 116. That is, the upper air-conditioning case 110 has a semi-circular groove 112, and the lower air-conditioning case 120 also has a semi-circular groove 122. The side bracket 115 has a semi-circular groove 113 corresponding to the semi-circular grooves 112 and 122 of the upper and lower air-conditioning cases 110 and 120 in order to form a circular pipe insertion hole 116 when the side bracket 115 is joined to the air-conditioning case.

The upper air-conditioning case 110 has a combining protrusion 118 to be combined with the seal 160, and the lower air-conditioning case 120 has a combining protrusion 128 to be combined with the seal 160.

The bracket 140 is made of a rigid plastic material and is inserted into the opening portion 117 of the air-conditioning case. The bracket 140 is combined between the upper air-conditioning case 110 and the lower air-conditioning case 120. The bracket 140 is fixed when a pipe is inserted. In this instance, the bracket 140 has a through hole 141 formed in the back-and-forth direction of the vehicle so that the evaporator pipe 171 is inserted and fixed into the through hole 141 of the bracket 140. A joint flange 145 may be combined with the front of the bracket 140.

The evaporator pipe 171 extends from the evaporator and is connected to the expansion valve 130 after passing through the through hole 141 of the bracket 140. An insulation tube 172 for sealing may be combined with the outer circumferential surface of the evaporator pipe 171. The heater core pipe 181 extends from the heater core, and pass through a heater core pipe insertion hole 162 formed in the seal 160 after passing through the pipe insertion hole 116 of the air-conditioning case. An insulation tube 182 for sealing may be combined with the outer circumferential surface of the heater core pipe 181.

The evaporator pipe 171 is connected to the rear of the expansion valve 130. The expansion valve 130 is combined with the front of the bracket 145 and is inserted into an expansion valve insertion hole 161 formed in the seal 160.

The seal 160 is made of a soft material, and may be an FOD seal of a high density type. The seal 160 is combined with the front of the air-conditioning case, and the bracket 140 is fixed between the air-conditioning case and the seal 160 to get in contact with the air-conditioning case. The dash panel 150 is combined with the seal 160. The dash panel 150 is combined with the front of the air-conditioning case. The seal 160 includes the expansion valve insertion hole 161 for inserting the expansion valve 130 thereinto, and the heater core pipe insertion hole 162 for inserting the heater core pipe 181 thereinto.

Figure 6:
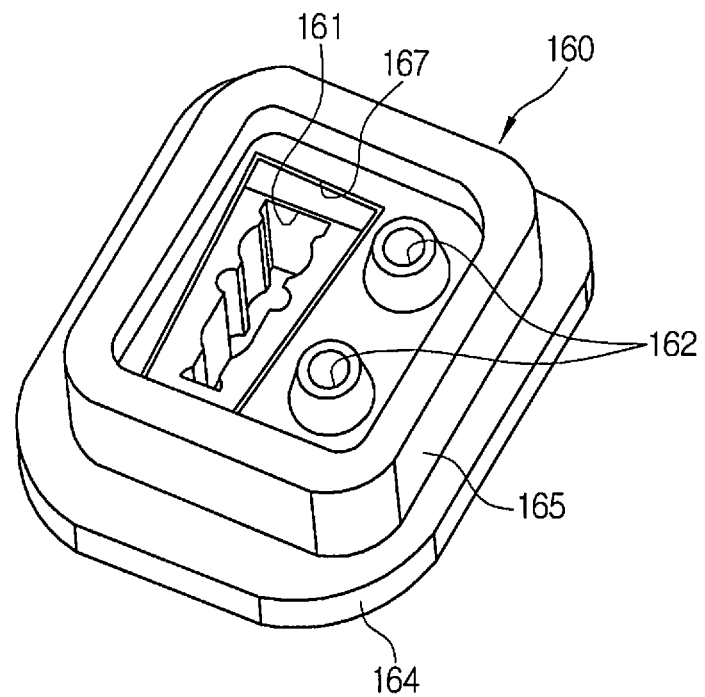
FIG. 6 is a front perspective view of the seal according to the first preferred embodiment of the present invention.
Figure 7:
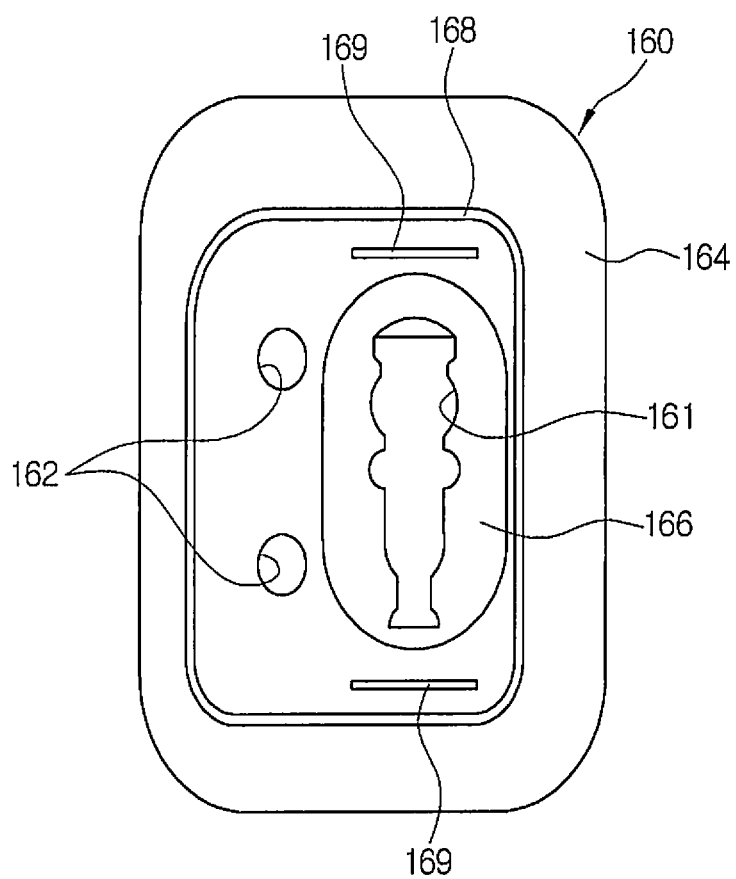
FIG. 7 is a rear view of the seal according to the first preferred embodiment of the present invention.
Figure 8:
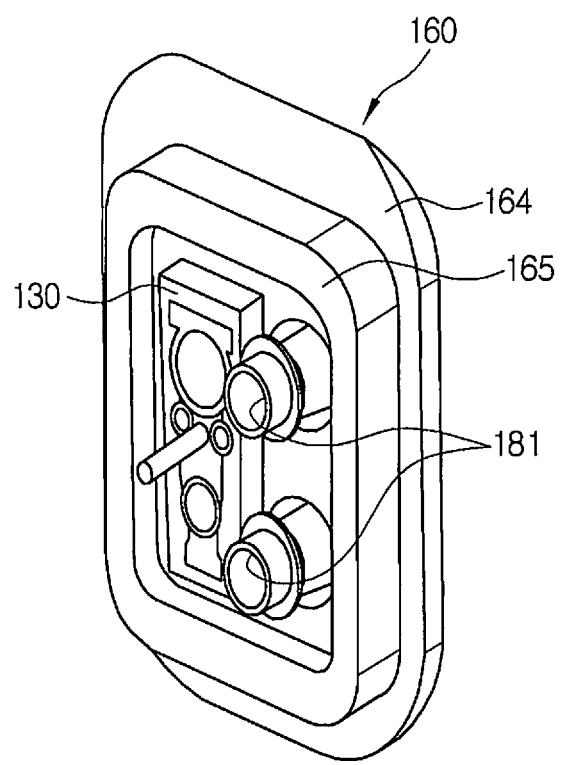
FIG. 8 is a perspective view showing a state where the expansion valve and a heater core pipe of FIG. 6 are mounted.
Figure 9:
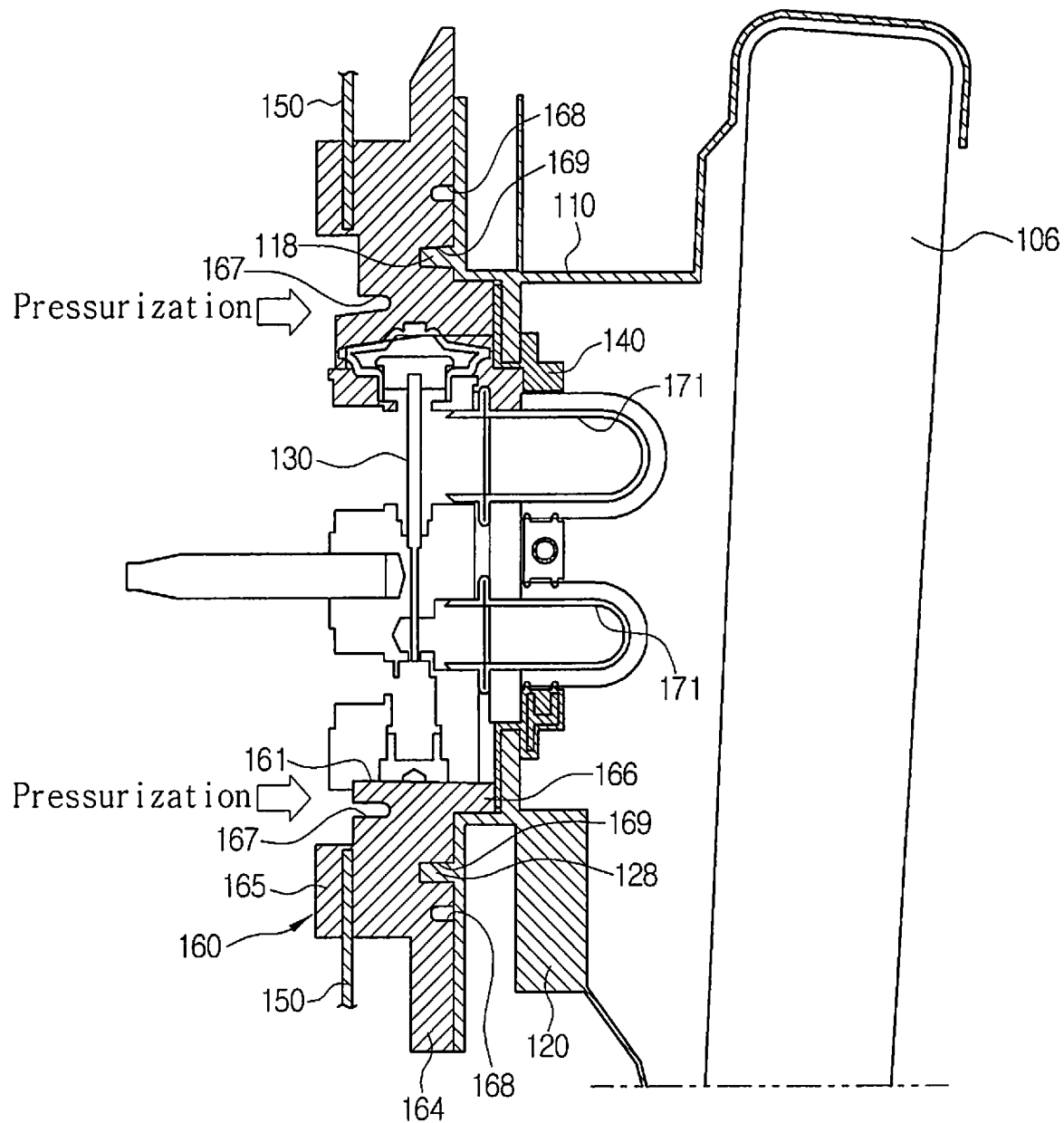
FIG. 9 is a sectional view showing a state where the seal according to the first preferred embodiment of the present invention pressurizes the bracket and the air-conditioning case.
Figure 10:
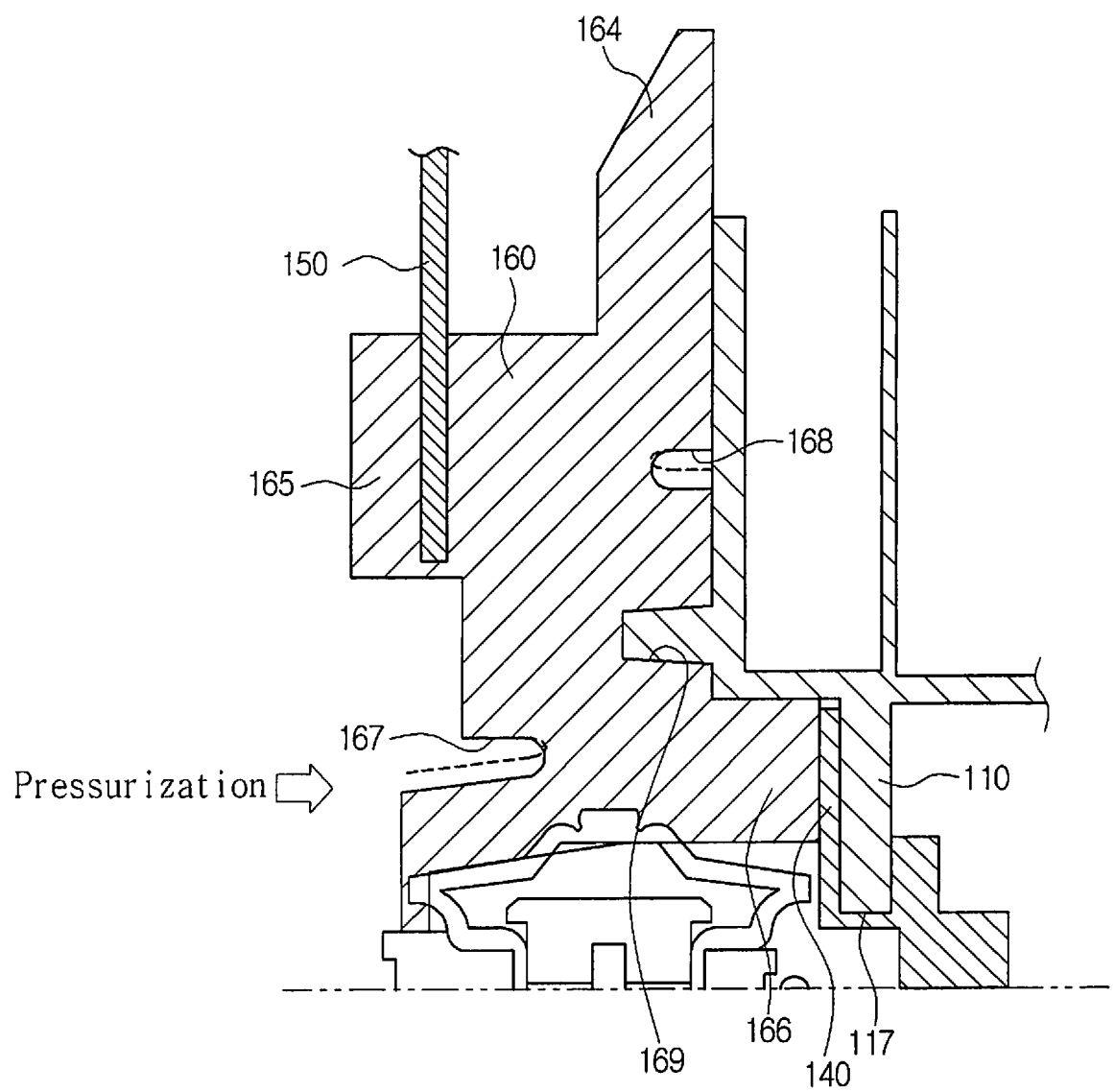
FIG. 10 is a partially exploded sectional view of FIG. 9.

FIG. 6 is a front perspective view of the seal according to the first preferred embodiment of the present invention, FIG. 7 is a rear view of the seal according to the first preferred embodiment of the present invention, FIG. 8 is a perspective view showing a state where the expansion valve and a heater core pipe of FIG. 6 are mounted, FIG. 9 is a sectional view showing a state where the seal according to the first preferred embodiment of the present invention pressurizes the bracket and the air-conditioning case, and FIG. 10 is a partially exploded sectional view of FIG. 9.

Referring to FIGS. 6 to 10, the seal 160 includes a flange part 164, a first protrusion part 166, and a second protrusion part 165.

The flange part 164 has a plate shape having a predetermined thickness in the back-and-forth direction of the vehicle, and is combined with the air-conditioning case. A combining part 169 is disposed at the rear of the flange part 164. The combining part 169 is to be combined with the air-conditioning case, and is formed in a groove shape. The combining part 169 is combined with the combining protrusions 118 and 128 formed on the air-conditioning case.

The first protrusion part 166 protrudes from the rear surface of the flange part 164. The first protrusion part 166 protrudes to the rear of the vehicle to pressurize the bracket 140 toward the air-conditioning case and comes into contact with the bracket 140. The first protrusion part 166 is formed along the edge of the expansion valve insertion hole 161.

The second protrusion part 165 protrudes from the front surface of the flange part 164. The second protrusion part 165 protrudes toward the front of the vehicle from the flange part 164 and is combined with the dash panel 150. The second protrusion part 165 is formed to surround the expansion valve insertion hole 161 and the heater core pipe insertion hole 162.

When the dash panel 150 and the air-conditioning case are combined with each other, the dash panel 150 pressurizes the second protrusion part 165, and the first protrusion part 166 pressurizes the bracket 140, so that the first protrusion part 166 and the second protrusion part 165 come into contact with the air-conditioning case to enhance sealing performance.

In this instance, preferably, the second protrusion part 165 is formed outside in a radial direction more than the first protrusion part 166. Therefore, when the dash panel 150 pressurizes the second protrusion part 165 of the seal 160 toward the rear from the front of the vehicle, the first protrusion part 166 receives power in the direction to be widened in the radial direction and fills up a fine gap between the bracket 140 and the air-conditioning case not only in the back-and-forth direction of the vehicle but also in the radial direction to provide more effective sealing performance.

Furthermore, the seal 160 has a first concave groove 168 formed in a contact surface between the seal and the air-conditioning case. Additionally, the seal 160 has a second concave groove 167 formed in the opposite side to the side where the first concave groove 168 is formed.

The first concave groove 168 is formed in the rear surface of the flange part 164. The first concave groove 168 is formed to surround the expansion valve insertion hole 161 and the heater core pipe insertion hole 162. The first concave groove 168 forms a predetermined space part between the seal 160 and the air-conditioning case, so that the seal 160 is elastically transformed more smoothly when the dash panel 150 pressurizes the seal 160, thereby enhancing sealing performance.

The second concave groove 167 is formed in the front surface of the flange part 164. The second concave groove 167 is formed to surround the expansion valve insertion hole 161. The second concave groove 167 elastically transforms the seal 160 more smoothly when the dash panel 150 pressurizes the seal 160, thereby enhancing sealing performance.

In this instance, the first concave groove 168 is formed outside in the radial direction more than the second concave groove 167. Moreover, the first concave groove 168 is formed outside in the radial direction more than the combining part 169. Through the above structure, when the dash panel 150 pressurizes the seal 160 toward the rear from the front of the vehicle, the first concave groove 168 is elastically transformed by receiving power from the inside to the outside in the radial direction, and the second concave groove 167 is also elastically transformed by receiving power from the inside to the outside in the radial direction. Finally, the seal 160 receives power in the direction to be widened in the radial direction and fills up the fine gap between the bracket 140 and the air-conditioning case not only in the back-and-forth direction of the vehicle but also in the radial direction to provide more effective sealing performance.

The air conditioner for a vehicle according to the embodiment of the present invention can enhance sealability when the seal pressurizes the bracket and doubly seal the gap between the expansion valve and the seal.

Therefore, the air conditioner for a vehicle according to the embodiment of the present invention can increase the function to reduce noise transferred from the engine room, has strong durability against vibration transferred from the vehicle, and can prevent inflow of water by strengthening watertightness.

Figure 11:
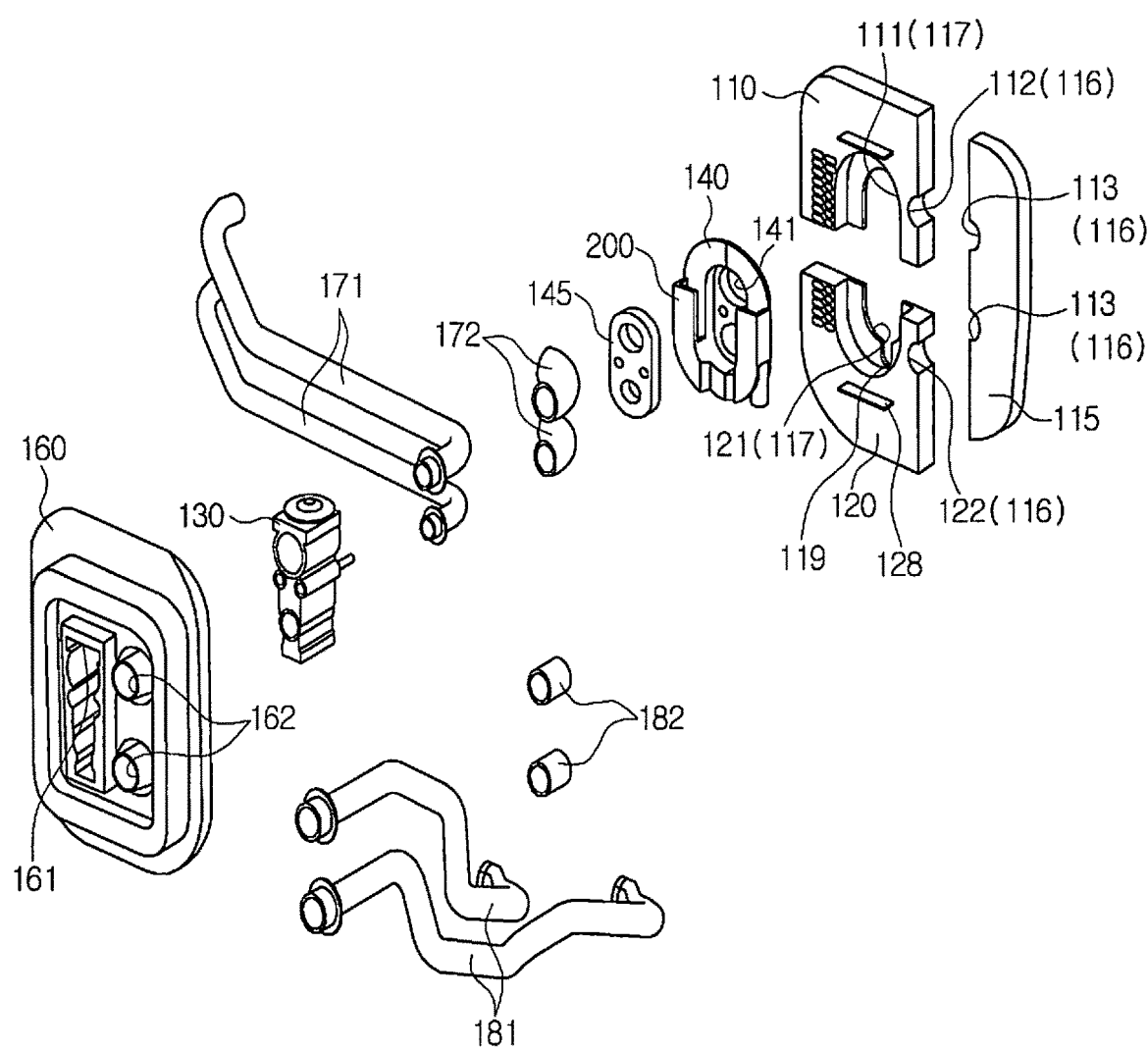
FIG. 11 is an exploded perspective view showing an air-conditioning case, a bracket, an expansion valve and a seal of an air conditioner for a vehicle according to a second preferred embodiment of the present invention.
Figure 12:
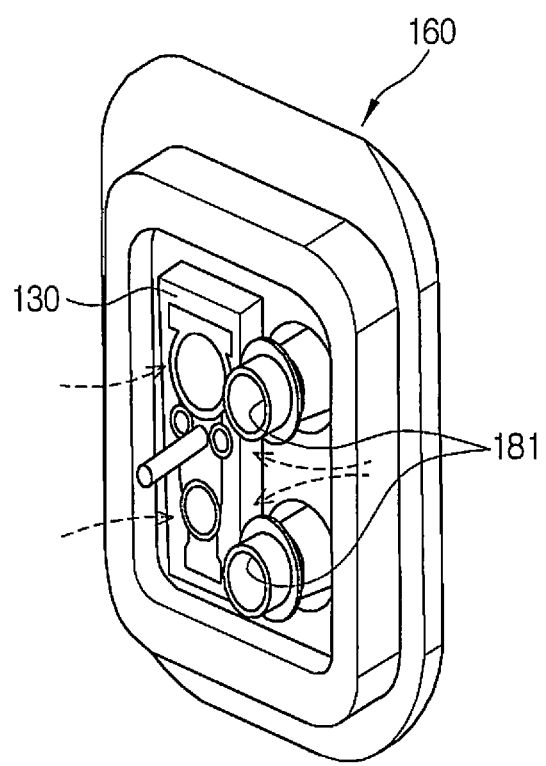
FIG. 12 is a perspective view of the expansion valve and the seal according to the second preferred embodiment of the present invention.
Figure 13:
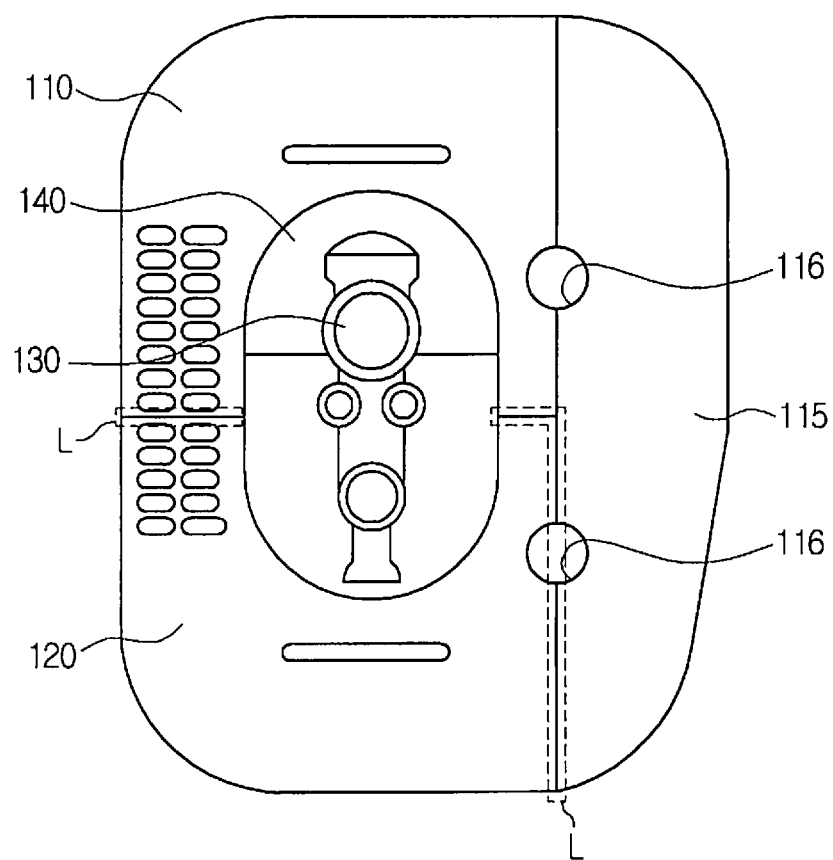
FIG. 13 is a front view of FIG. 11.
Figure 14:
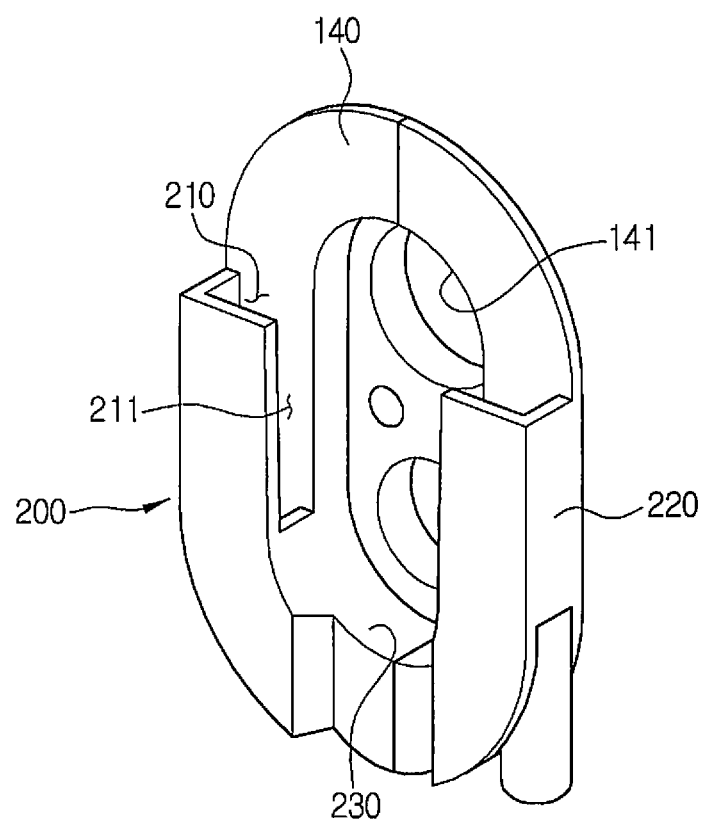
FIG. 14 is a perspective view showing the bracket and a negative pressure forming part according to the second preferred embodiment of the present invention.
Figure 15:
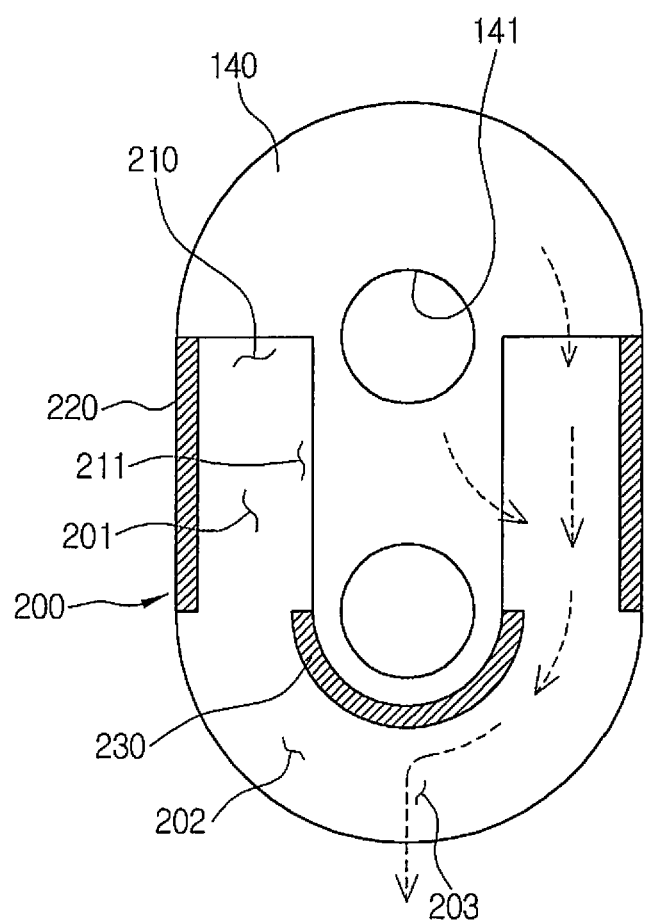
FIG. 15 is a front sectional view of FIG. 14.
Figure 16:
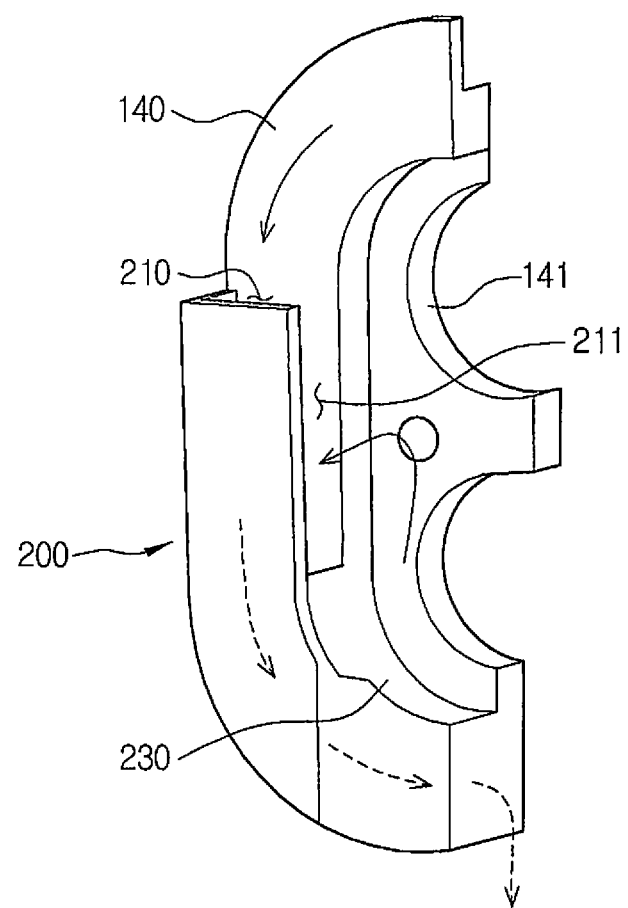
FIG. 16 is a front perspective view showing that the bracket and the negative pressure forming part according to the second preferred embodiment of the present invention are partially cut.
Figure 17:
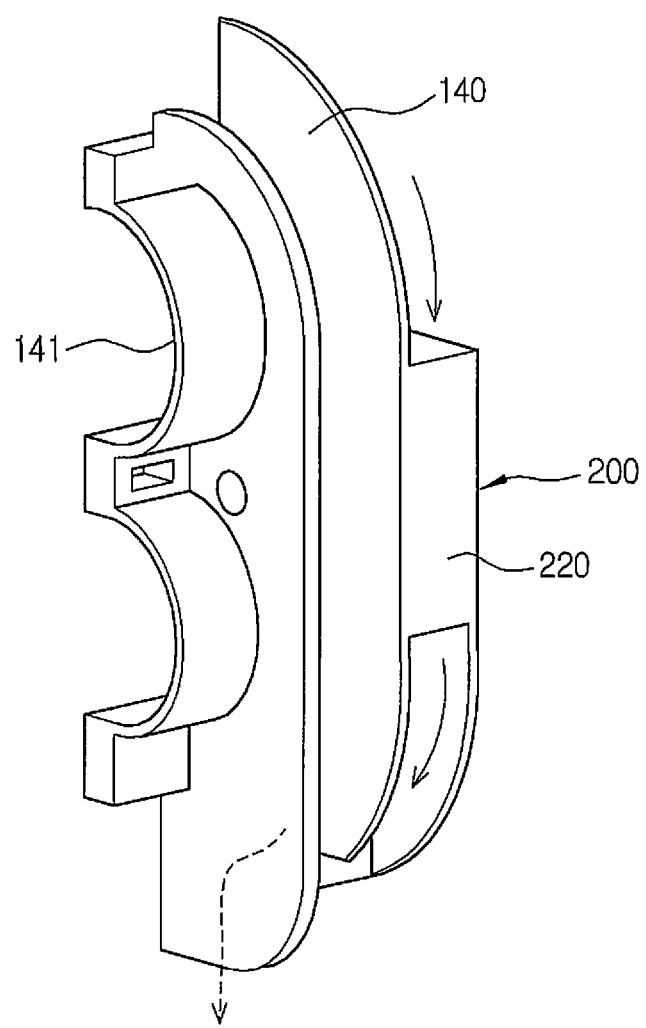
FIG. 17 is a rear perspective view showing that the bracket and the negative pressure forming part according to the second preferred embodiment of the present invention are partially cut.
Figure 18:
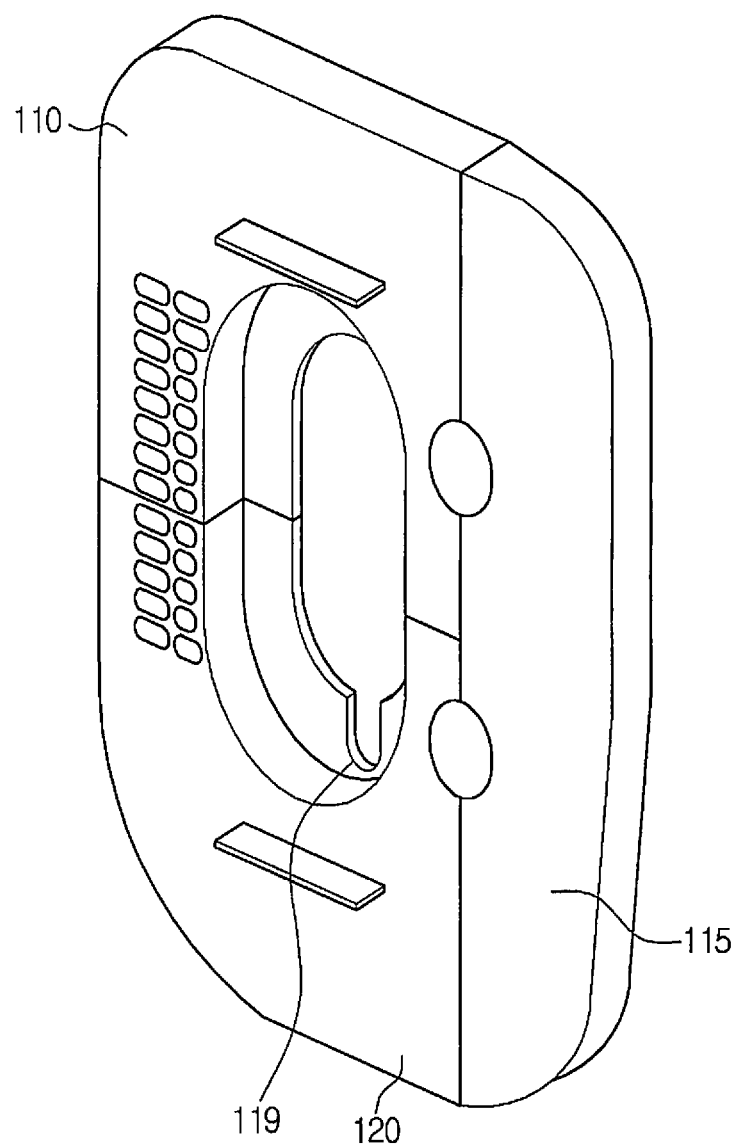
FIG. 18 is a perspective view showing the air-conditioning case according to the second preferred embodiment of the present invention.
Figure 19:
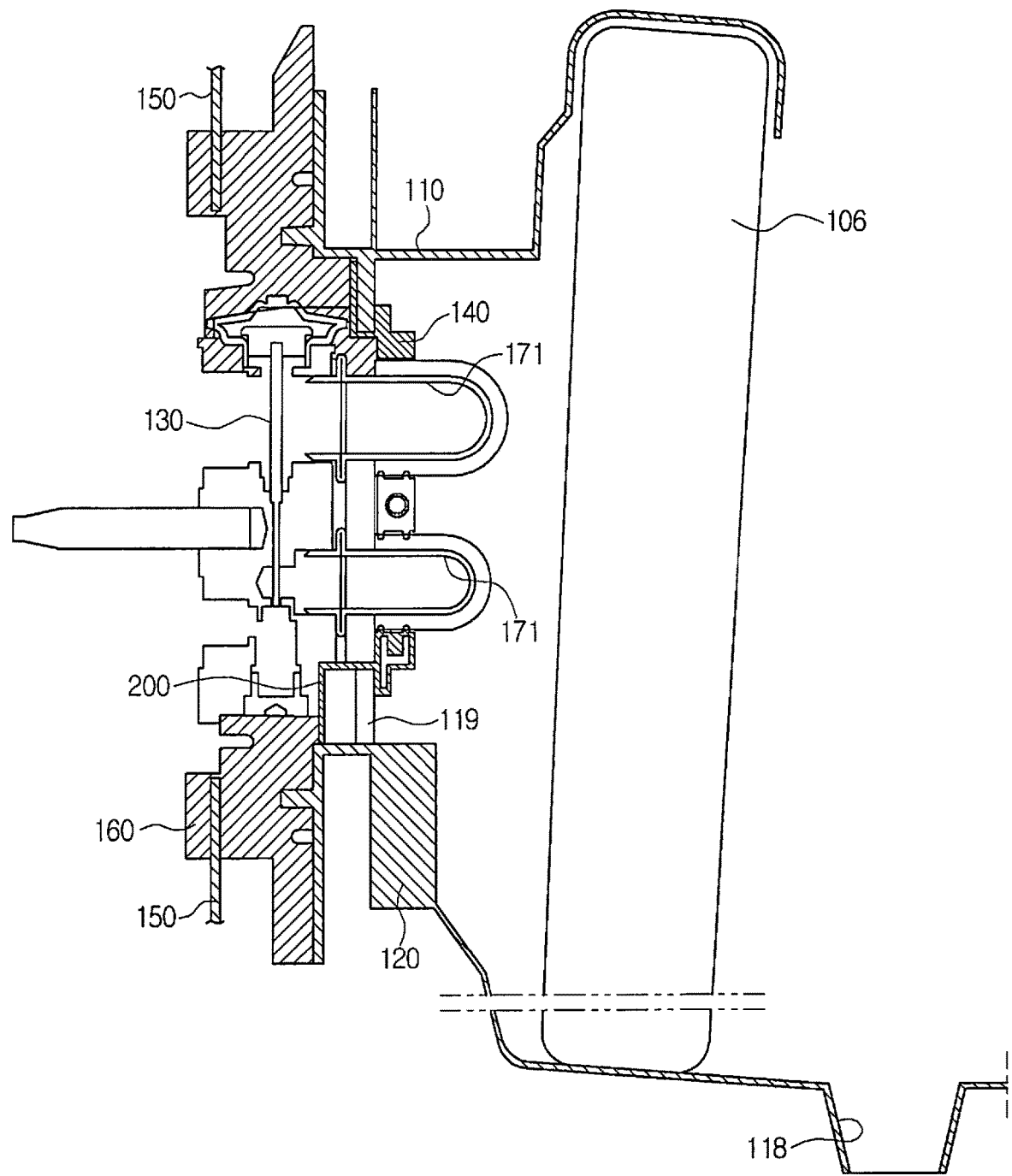
FIG. 19 is a sectional view showing a state where the air-conditioning case, the bracket, the expansion valve and the seal according to the second preferred embodiment of the present invention are combined.

FIG. 11 is an exploded perspective view showing an air-conditioning case, a bracket, an expansion valve and a seal of an air conditioner for a vehicle according to a second preferred embodiment of the present invention, FIG. 12 is a perspective view of the expansion valve and the seal according to the second preferred embodiment of the present invention, FIG. 13 is a front view of FIG. 11, FIG. 14 is a perspective view showing the bracket and a negative pressure forming part according to the second preferred embodiment of the present invention, FIG. 15 is a front sectional view of FIG. 14, FIG. 16 is a front perspective view showing that the bracket and the negative pressure forming part according to the second preferred embodiment of the present invention are partially cut, FIG. 17 is a rear perspective view showing that the bracket and the negative pressure forming part according to the second preferred embodiment of the present invention are partially cut, FIG. 18 is a perspective view showing the air-conditioning case according to the second preferred embodiment of the present invention, and FIG. 19 is a sectional view showing a state where the air-conditioning case, the bracket, the expansion valve and the seal according to the second preferred embodiment of the present invention are combined.

Hereinafter, the left direction of FIG. 19 is called 'the front of the vehicle', and the right direction is called 'the rear of the vehicle'.

Referring to FIGS. 2 and 11 to 19, the air conditioner for a vehicle according to the second preferred embodiment of the present invention has a structure that pipes of a heat exchanger, namely, an evaporator pipe 171 and a heater core pipe 181 penetrate through a dash panel 150 of the vehicle, and includes a bracket 140, an expansion valve 130, and a seal 160. The air-conditioning case includes an upper air-conditioning case 110, a lower air-conditioning case 120, and a side bracket 115.

The lower air-conditioning case 120 is joined to a lower portion of the upper air-conditioning case 110, and an opening portion 117 is formed between the upper air-conditioning case 110 and the lower air-conditioning case 120. The bracket 140 is inserted and joined into the opening portion 117. That is, the upper air-conditioning case 110 has a semi-elliptical groove 111, and the lower air-conditioning case 120 also has a semi-elliptical groove 121 corresponding to the semi-elliptical groove 111 of the upper air-conditioning case 110, so that the elliptical opening portion 117 is formed when the upper air-conditioning case 110 and the lower air-conditioning case 120 are coupled with each other.

The side bracket 115 is joined to the sides of the upper air-conditioning case 110 and the lower air-conditioning case 120 in order to form a pipe insertion hole 116 between the upper air-conditioning case 110 and the lower air-conditioning case 120. The heater core pipe 181 is inserted and fixed into the pipe insertion hole 116. That is, the upper air-conditioning case 110 has a semi-circular groove 112, and the lower air-conditioning case 120 also has a semi-circular groove 122. The side bracket 115 has a semi-circular groove 113 corresponding to the semi-circular grooves 112 and 122 of the upper and lower air-conditioning cases 110 and 120 in order to form a circular pipe insertion hole 116 when the side bracket 115 is joined to the air-conditioning case.

The bracket 140 is made of a rigid plastic material and is inserted into the opening portion 117 of the air-conditioning case. The bracket 140 is combined between the upper air-conditioning case 110 and the lower air-conditioning case 120. The bracket 140 is fixed when a pipe is inserted. In this instance, the bracket 140 has a through hole 141 formed in the back-and-forth direction of the vehicle so that the evaporator pipe 171 is inserted and fixed into the through hole 141 of the bracket 140. A joint flange 145 may be combined with the front of the bracket 140.

The evaporator pipe 171 extends from the evaporator and is connected to the expansion valve 130 after passing through the through hole 141 of the bracket 140. An insulation tube 172 for sealing may be combined with the outer circumferential surface of the evaporator pipe 171. The heater core pipe 181 extends from the heater core, and pass through a heater core pipe insertion hole 162 formed in the seal 160 after passing through the pipe insertion hole 116 of the air-conditioning case. An insulation tube 182 for sealing may be combined with the outer circumferential surface of the heater core pipe 181.

The evaporator pipe 171 is connected to the rear of the expansion valve 130. The expansion valve 130 is combined with the front of the bracket 145 and is inserted into an expansion valve insertion hole 161 formed in the seal 160.

The seal 160 is made of a soft material, and may be an FOD seal of a high density type. The seal 160 is combined with the front of the air-conditioning case, and the bracket 140 is fixed between the air-conditioning case and the seal 160 to get in contact with the air-conditioning case. The dash panel 150 is combined with the seal 160. The dash panel 150 is combined with the front of the air-conditioning case. The seal 160 includes the expansion valve insertion hole 161 for inserting the expansion valve 130 thereinto, and the heater core pipe insertion hole 162 for inserting the heater core pipe 181 thereinto.

The air conditioner for a vehicle according to the second preferred embodiment of the present invention includes a pressure drop means. The pressure drop means drops pressure around the expansion valve 130 to induce moisture into the air-conditioning case. The bracket 140 has a negative pressure forming part 200. The negative pressure forming part acts as the pressure drop means.

The negative pressure forming part 200 has a flow passageway formed at one side to form negative pressure in the flow passageway so as to collect moisture around the expansion valve 130 to a lower portion. The negative pressure forming part 200 is formed in such a way that the flow passage is curved at least once, so that a relatively complicated flow passageway is formed.

In a dusty environment like a sidewalk, in order to run a vehicle, a driver has to clean dust penetrating into the engine room with water of high pressure. In this instance, when cleaning liquid of high pressure runs against the dash panel 150, moisture of high pressure is introduced through the fine gap of the seal 160 by pressure as indicated by the dotted arrow of FIG. 4, and penetrates into the interior of the vehicle through assembled sides (indicated by the dotted line "L" of FIG. 5) of the air-conditioning cases 110 and 120 and the side bracket 115.

The air conditioner for a vehicle according to the second preferred embodiment of the present invention can lower pressure around the expansion valve 130 through the complicated flow passageway of the negative pressure forming part 200. Furthermore, the complicated flow passageway can solve the noise problem by enhancing STL (Sound Transmission Loss) performance.

Additionally, the air-conditioning case has a through hole 119 for inducing the moisture collected by the negative pressure forming part 200 into the air-conditioning case. The through hole 119 is formed concavely in the bottom surface of the semi-elliptical groove 121 of the lower air-conditioning case 120. The moisture collected at the lower portion by the negative pressure forming part 200 is induced into the air-conditioning case through the through hole 119 and is discharged to the outside of the air-conditioning case through a drain hole 118 formed below the evaporator 106.

Now, the negative pressure forming part 200 will be described in more detail. The flow passageway of the negative pressure forming part 200 includes an inflow space part 201, a curved space part 202, and an outflow space part 203. The inflow space part 201 communicates with the outside through opening parts 210 and 211 and is located above the flow passageway of the negative pressure forming part 200. The curved space part 202 is formed to be curved at least once in the inflow space part 201 and is located below the inflow space part 201. The outflow space part 203 extends from the curved space part 202 in a downward direction. In this embodiment, the curved space part 202 is curved once, but may be curved twice, three times or more to form a more complicated flow passageway.

The opening parts 210 and 211 are divided into an upward opening part 210 opened upwardly to introduce moisture upwardly and a side opening part 211 opened laterally to introduce moisture laterally. Therefore, the opening parts 210 and 211 can collect moisture upwardly and laterally and drain the moisture more smoothly by the upward opening part 210 and the side opening part 211. In addition, the side opening part 211 can enhance pressure drop effect by making the flow passageway complicated since making the moisture introduced laterally curve toward the curved space part 202 once more.

The negative pressure forming part 200 includes a side wall part 220 and an upper wall part 230. The side wall part 220 extends forwardly from one side of the bracket 140 to guide moisture downwardly. The upper wall part 230 extends forwardly from one side of the bracket 140 to horizontally divide the outflow space part 203 and the outside. The upper wall part 230 forms a curved passageway, so that the moisture introduced into the opening parts 210 and 211 goes to the outflow space part 203 through the inflow space part 201 and the curved space part 202, and then, is discharged out.

The negative pressure forming part 200 integrally extends from one side of the bracket 140 to the front by the side wall part 220 and the upper wall part 230, and forms a curved passageway by a member extending to one side of the bracket 140. The upper wall part 230 is formed in a "u" shape, and is preferably curved in a streamlined shape from the top to the bottom. Therefore, since the curved passageway is formed in the negative pressure forming part 200 by the minimum configuration, the air conditioner for a vehicle according to the second preferred embodiment of the present invention can effectively form the complicated passageway and prevent penetration of moisture into the assembled sides of the air-conditioning case by dropping pressure around the expansion valve 130 and solve the noise problem.

The air conditioner for a vehicle according to the second preferred embodiment of the present invention can solve the drainage degradation problem by greatly enhancing drain performance since inducing moisture into the air-conditioning case using a pressure difference by the pressure drop means, and does not interrupt the flow of air and does not deteriorate air-conditioning performance since the air conditioner does not use air-conditioned air and does not need an air guide means.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims and the equivalences.

What is claimed is:

1. An air conditioner for a vehicle, which has a structure that a pipe of a heat exchanger penetrates through a dash panel of the vehicle, the air conditioner comprising: a bracket for inserting and fixing the pipe; and a seal for fixing the bracket between an air-conditioning case and the seal to get in contact with the air-conditioning case; an expansion valve combined with a front of the bracket to connect pipes; and a pressure drop means for dropping pressure around the expansion valve to induce moisture into the air-conditioning case; wherein the bracket includes a negative pressure forming part having a flow passageway formed at one side to collect moisture around the expansion valve downwardly by forming negative pressure in the flow passageway.

2. The air conditioner according to claim 1, wherein the bracket is made of a rigid material and is inserted into an opening part of the air-conditioning case, and
wherein the seal is made of a soft material and is combined with the front of the air-conditioning case.

3. The air conditioner according to claim 2, wherein the air-conditioning case is assembled to the rear of the dash panel, and the dash panel is combined with the seal.

4. The air conditioner according to claim 3, wherein an expansion valve is combined with the front of the bracket, and the seal has an expansion valve insertion hole for inserting the expansion valve thereinto.

5. The air conditioner according to claim 3, wherein the seal has a heater core pipe insertion hole for inserting a heater core pipe thereinto.

6. The air conditioner according to claim 5, wherein the air-conditioning case includes: an upper air-conditioning case a lower air-conditioning case combined with a lower portion of the upper air-conditioning case and forming an opening part between the upper air-conditioning case and the lower air-conditioning case, and a side bracket combined with sides of the upper air-conditioning case and the lower air-conditioning case and forming a pipe insertion hole between the upper air-conditioning case and the lower air-conditioning case.

7. The air conditioner according to claim 3, wherein the seal includes: a first protrusion part protruding toward the rear of the vehicle to pressurize the bracket toward the air-conditioning case to get in contact with the air-conditioning case; a flange part combined with the air-conditioning case; and a second protrusion part protruding toward the rear of the vehicle from the flange part and combined with the dash panel.

8. The air conditioner according to claim 3, wherein the seal includes a first concave groove formed in a contact surface between the seal and the air-conditioning case, and a second concave groove formed in the opposite side to the side where the first concave groove is formed.

9. The air conditioner according to claim 8, wherein the second protrusion part is formed outside in a radial direction more than the first protrusion part, and
wherein the first concave groove is formed outside in a radial direction more than the second concave groove.

10. The air conditioner according to claim 8, wherein the seal has a combining part combined with the air-conditioning case, and the first concave groove is formed outside in a radial direction more than the combining part.

11. The air conditioner according to claim 1, wherein the negative pressure forming part is formed in such a way that the flow passageway is curved at least once.

12. The air conditioner according to claim 1, wherein the air-conditioning case has a through hole for inducing the moisture collected by the negative pressure forming part into the air-conditioning case.

13. The air conditioner according to claim 1, wherein the flow passageway of the negative pressure forming part includes an inflow space part communicating with the outside through opening parts, a curved space part formed to be curved in the inflow space part, an outflow space part extending from the curved space part in a downward direction.

14. The air conditioner according to claim 13, wherein the opening parts are divided into an upward opening part opened upwardly to introduce moisture upwardly and a side opening part opened laterally to introduce moisture laterally.

15. The air conditioner according to claim 13, wherein the negative pressure forming part includes:
a side wall part extending forwardly from one side of the bracket to guide moisture downwardly;
an upper wall part extending forwardly from one side of the bracket to horizontally divide the outflow space part and the outside and forming a curved passageway, so that the moisture goes to the outflow space part through the inflow space part and the curved space part and is discharged out.

16. The air conditioner according to claim 15, wherein the negative pressure forming part integrally extends from one side of the bracket to the front by the side wall part and the upper wall part, and forms a curved passageway by a member extending to one side of the bracket.

17. The air conditioner according to claim 15, wherein the upper wall part is formed in a "u" shape, and is curved in a streamlined shape from the top to the bottom.

18. The air conditioner according to claim 1, wherein the bracket is made of a rigid material, and
wherein the seal is made of a soft material, and has an expansion valve insertion hole for inserting the expansion valve thereinto.

* * * * *